(12) United States Patent
Ono

(10) Patent No.: US 12,525,645 B2
(45) Date of Patent: Jan. 13, 2026

(54) LITHIUM ION CONDUCTOR PRECURSOR GLASS AND LITHIUM ION CONDUCTOR

(71) Applicants: OHARA INC., Sagamihara (JP); TOYOTA JIDOSHA KABUSHIKI KAISHA, Toyota (JP)

(72) Inventor: Tomomi Ono, Kanagawa (JP)

(73) Assignees: OHARA INC., Sagamihara (JP); TOYOTA JIDOSHA KABUSHIKI KAISHA, Toyoto (JP)

(*) Notice: Subject to any disclaimer, the term of this patent is extended or adjusted under 35 U.S.C. 154(b) by 0 days.

(21) Appl. No.: 18/357,601

(22) Filed: Jul. 24, 2023

(65) Prior Publication Data

US 2023/0369642 A1    Nov. 16, 2023

Related U.S. Application Data

(63) Continuation of application No. 16/758,693, filed as application No. PCT/JP2018/030273 on Aug. 14, 2018, now abandoned.

(30) Foreign Application Priority Data

Oct. 25, 2017 (JP) ................. 2017-206574

(51) Int. Cl.
| | |
|---|---|
| H01M 10/0562 | (2010.01) |
| C03C 1/00 | (2006.01) |
| C03C 4/14 | (2006.01) |
| C03C 10/00 | (2006.01) |
| H01M 10/0525 | (2010.01) |

(52) U.S. Cl.
CPC .......... *H01M 10/0562* (2013.01); *C03C 1/00* (2013.01); *C03C 4/14* (2013.01); *C03C 10/00* (2013.01); *H01M 10/0525* (2013.01); *C03C 2204/00* (2013.01); *H01M 2300/0071* (2013.01)

(58) Field of Classification Search
None
See application file for complete search history.

(56) References Cited

U.S. PATENT DOCUMENTS

| | | | |
|---|---|---|---|
| 2012/0237834 A1* | 9/2012 | Ogasa | H01M 10/0525 264/234 |
| 2021/0184248 A1 | 6/2021 | Ono | |

FOREIGN PATENT DOCUMENTS

| | | | |
|---|---|---|---|
| JP | S62128946 A | * | 6/1987 |
| JP | 2012209256 A | | 10/2012 |
| JP | 2013112599 A | * | 6/2013 |
| JP | 2015127281 A | | 7/2015 |
| JP | 2015153588 A | | 8/2015 |
| JP | 2016024916 A | | 2/2016 |

OTHER PUBLICATIONS

Wuchereria, Xiamen "Basis of Applied Electrochemistry"; University Press, 1st Edition, Mar. 2006, see pp. 390-391*As the English translation of this document is not available, please submit the machine translation of the Office Action as a concise explanation of the relevance.
CNIPA 2nd Office Action for corresponding CN Application No. 201880068196.4; Dated May 16, 2022.
Ed. Northwestern Society of Light Industries, "Glass Technology"; China Light Industry Press, 1st Edition; 3 pages; *As the English translation of this document is not available, please submit the machine translation of the Office Action as a concise explanation of the relevance.
USPTO Final Office Action for corresponding U.S. Appl. No. 16/758,693; Dated, Sep. 21, 2022.
International Search Report for International Application No. PCT/JP2018/030273; mailing date of Sep. 18, 2018.
USPTO Non-Final Office Action for corresponding U.S. Appl. No. 16/758,693, Dated, Jun. 2, 2022.
JPO Notification of Reasons for Refusal issued in corresponding JP Application No. 2017-206574, mailed on Aug. 31, 2021.

* cited by examiner

*Primary Examiner* — Zhongqing Wei
(74) *Attorney, Agent, or Firm* — CANTOR COLBURN LLP

(57) ABSTRACT

As a solid electrolyte used in a lithium ion secondary battery, it has not been possible to obtain a lithium ion conductor precursor glass and a lithium ion conductor in which crystallization progresses at low temperatures and which exhibit high ion conductivity. The present invention can obtain a lithium ion conductor precursor glass and a lithium ion conductor in which crystallization progresses even at low temperatures and which exhibit high ion conductivity by containing 10-35% of a $Li_2O$ component, 20-50% of a $P_2O_5$ component, greater than 0% to 15% of an $Al_2O_3$ component, 20-50% of a $GeO_2$ component and greater than 0% to 15% of a $Bi_2O_3$ component and/or a $TeO_2$ component.

15 Claims, No Drawings

LITHIUM ION CONDUCTOR PRECURSOR GLASS AND LITHIUM ION CONDUCTOR

CROSS REFERENCE TO PRIOR APPLICATIONS

The present application is a continuation application of U.S. patent Ser. No. 16/758,693 filed on Apr. 23, 2020, the entire contents of which are incorporated herein by reference and priority to which is hereby claimed. Application Ser. No. 16/758,693 is the U.S. national stage of application No. PCT/JP2018/030273, filed on Aug. 14, 2018. Priority under 35 U.S.C. § 119(a) and 35 U.S.C. § 365(b) is hereby claimed from Japanese Application No. 2017-206574 filed Oct. 25, 2017, the disclosure of which is also incorporated herein by reference.

TECHNICAL FIELD

The present invention relates to a lithium ion conductor which is suitable as a solid electrolyte mainly for a lithium ion secondary battery.

BACKGROUND ART

Recently, lithium ion secondary batteries, which have high energy density, and which are rechargeable and dischargeable, are widely used in applications such as a power supply for electric vehicles or a power supply for portable terminals. In many lithium ion secondary batteries currently on the market generally, a liquid electrolyte (electrolytic solution) such as an organic solvent is used because of its high energy density. For this electrolytic solution, a lithium salt is dissolved in an aprotic organic solvent such as a carbonate ester or a cyclic ester and used.

However, a lithium ion secondary battery containing a liquid electrolyte (electrolytic solution) has a risk that the electrolytic solution may leak out. In addition, an organic solvent or the like generally contained in the electrolytic solution is a combustible substance, and such a combustible substance is not preferable from the viewpoint of safety.

Therefore, it has been proposed to use a solid electrolyte instead of the liquid electrolyte (electrolytic solution), such as an organic solvent. In addition, solid secondary batteries which comprises a solid electrolyte as an electrolyte, and other constituent members of which are also formed of solid have been developed.

Japanese Patent Application, Publication No. 2013-112599 (hereinafter, referred to as "Patent Document 1") discloses a lithium ion conductor containing a crystal of $Li_{1+x}Al_xGe_{2-x}(PO_4)_3$ as a solid electrolyte contained in lithium ion secondary batteries.

However, crystallization temperature of the composition disclosed in Patent Document 1 is high, and when the composition is used concurrently with another component, such as an electrode active material, there is a problem that the composition reacts with the other component and causes deterioration of battery performance. In addition, there is a problem that ionic conductivity required for battery performance cannot be obtained at a temperature at which reaction with the other component does not occur.

Patent Document 1: Japanese Unexamined Patent Application, Publication No. 2013-112599

DISCLOSURE OF THE INVENTION

Problems to be Solved by the Invention

It is an object of the present invention to solve the above-mentioned problems and to provide a lithium ion conductor precursor glass which has ion conductivity required for battery performance and in which crystallization proceeds at a low temperature, and to provide a lithium ion conductor.

Means for Solving the Problems

A first aspect of the present invention is a lithium ion conductor precursor glass, comprising:
a $Li_2O$ component in an amount of 10 to 35%,
a $P_2O_5$ component in an amount of 20 to 50%,
an $Al_2O_3$ component in an amount of greater than 0% and to 15%,
a $GeO_2$ component in an amount of 20 to 50%, and
a $Bi_2O_3$ component and/or a $TeO_2$ component in an amount of greater than 0% to 15%, with % being in mol %.

A second aspect of the present invention is the lithium ion conductor precursor glass as described in the first aspect, characterized in that a mass ratio of ($Bi_2O_3$ or/and $TeO_2$)/$GeO_2$ is 1.0 or less.

A third aspect of the present invention is the lithium ion conductor precursor glass as described in the first or second aspect, in which $T_X$ temperature in TG-DTA measurement is less than 590° C.

A fourth aspect of the present invention is a lithium ion conductor, characterized in that the lithium ion conductor is obtained by subjecting the lithium ion conductor precursor glass as described in any one of the first to third aspects to a heat treatment, so that the lithium ion conductor precursor glass crystalizes.

A fifth aspect of the present invention is the lithium ion conductor as described in the fourth aspect, characterized in that a crystal of $Li_{1+x}Al_xGe_{2-x}(PO_4)_3$ (0<x<2) is precipitated.

A sixth aspect of the present invention is the lithium ion conductor as described in the fourth or fifth aspect, characterized in that lithium ion conductivity at 25° C. is $1\times10^{-7}$ S/cm or more.

A seventh aspect of the present invention is the lithium ion conductor as described in any one of the fourth to sixth aspects, characterized in that the lithium ion conductor is used for a solid electrolyte for a lithium ion battery.

An eighth aspect of the present invention is an electrode composite element, comprising 1.0 to 99.9 volume % of a positive or negative active material and 0.1 to 99.0 volume % of the lithium ion conductor as described in any one of the fourth to seventh aspects.

A ninth aspect of the present invention is a lithium ion half cell or a lithium ion battery comprising a combination of the lithium ion conductor as described in any one of the fourth to seventh aspects with the electrode composite element as described in eighth aspect.

PREFERRED MODE FOR CARRYING OUT THE INVENTION

The lithium ion conductor precursor glass of the present invention is characterized by containing a $Li_2O$ component in an amount of 10 to 35%, a $P_2O_5$ component in an amount of 20 to 50%, an $Al_2O_3$ component in an amount of greater than 0% to 15%, a $GeO_2$ component in an amount of 20 to 50% and a $Bi_2O_3$ component or/and a $TeO_2$ component in an amount of greater than 0% to 15%.

Embodiments of the lithium ion conductor precursor glass and the lithium ion conductor of the present invention are described below in detail, but the present invention is not limited to the following embodiments and can be implemented with appropriate modifications within the scope of the object of the present invention. Descriptions of overlapping portions may be omitted as appropriate, but the gist of the invention is not limited.

Contents of respective components included in the lithium ion conductor precursor glass and the lithium ion conductor of the present invention are expressed in mole % on an oxide basis unless otherwise specified. Here, "composition on an oxide basis" refers to a composition of each of the components in a glass electrolyte, when assuming that oxides, complex salts, metal fluorides, etc. used as raw materials of the glass electrolyte are entirely decomposed into oxides during melting and the total mass of the generated oxides corresponds to 100% by mass.

The $Li_2O$ component is essential to obtain lithium ion conductivity. In particular, setting the $Li_2O$ component content to 10% or more can improve a melting property of the glass and this results in reduction in the glass transition point. In addition, the lithium ion conductivity can be improved. Therefore, the $Li_2O$ component content is preferably 10% or more, more preferably greater than 10%, more preferably 13% or more, more preferably 15% or more, more preferably greater than 15%, and most preferably 18% or more. On the other hand, a $Li_2O$ component content of 35% or less can suppress devitrification of the glass during melting, and this improves weather resistance. In addition, reducing the $Li_2O$ component content suppresses precipitation of crystals other than the lithium ion conductive crystal, which tends to improve the lithium ion conductivity. Therefore, the $Li_2O$ component content is preferably 35% or less, more preferably less than 35%, more preferably less than 30%, and most preferably 27% or less.

The $P_2O_5$ component is a constitutional component of the lithium ion conductive crystal and is an essential component for forming glass networks. In particular, setting the $P_2O_5$ component content to 20% or more can increase viscosity of the glass, can lower the glass transition point and can improve stability of the glass. In addition, lithium ion conductive crystals tend to easily precipitate, and this results in improvement of the lithium ion conductivity. Therefore, the $P_2O_5$ component content is preferably 20% or more, more preferably greater than 20%, more preferably greater than 25%, more preferably greater than 30%, and most preferably 32% or more. On the other hand, setting the $P_2O_5$ component content to 50% or less tends to maintain precipitation of lithium ion conductive crystals and maintain a high lithium ion conductivity. Therefore, the $P_2O_5$ component content is preferably 50% or less, more preferably less than 50%, more preferably 47% or less, more preferably less than 45%, and most preferably 42% or less.

The $GeO_2$ component is an essential component constituting the lithium ion conductive crystal. In particular, setting the $GeO_2$ component content to 20% or more makes it easier for lithium ion conductive crystals to precipitate and tends to improve the lithium ion conductivity. Therefore, the $GeO_2$ component content is preferably 20% or more, more preferably greater than 20%, more preferably 28% or more, more preferably greater than 30%, and more preferably 32% or more. On the other hand, setting the $GeO_2$ component content to 50% or less tends to maintain precipitation of lithium ion conductive crystals and maintain a high lithium ion conductivity. Therefore, the $GeO_2$ component content is preferably 50% or less, more preferably less than 50%, more preferably 47% or less, more preferably less than 45%, and most preferably 42% or less.

The $Al_2O_3$ component is an essential component for constituting the lithium ion conductive crystal. In particular, setting the $Al_2O_3$ component content to be greater than 0% can increase chemical durability and devitrification resistance, and can improve the lithium ion conductivity of the lithium ion conductive crystal. Therefore, the $Al_2O_3$ component content is preferably greater than 0%, more preferably 0.5% or more, more preferably greater than 0.5%, more preferably 1% or more, and most preferably 1.5% or more. On the other hand, setting the $Al_2O_3$ component content to 15% or less tends to maintain precipitation of lithium ion conductive crystals and maintain a high lithium ion conductivity. Therefore, the $Al_2O_3$ component content is preferably 15% or less, more preferably less than 15%, more preferably 12% or less, more preferably less than 10%, and most preferably 8% or less.

The $Bi_2O_3$ component is a component that can lower the glass transition point, when it is contained in an amount of greater than 0%. In particular, setting the $Bi_2O_3$ component content to be greater than 0% allows the glass to soften at a low temperature, and promotes precipitation of lithium ion conductive crystals at a low temperature. Therefore, the $Bi_2O_3$ component content is preferably greater than 0%, more preferably 0.5% or more, more preferably 0.8% or more, and most preferably 1% or more. On the other hand, setting the $Bi_2O_3$ component content to 15% or less tends to maintain easiness of precipitation of lithium ion conductive crystals at a low temperature and tends to maintain a high lithium ion conductivity. Therefore, the $Bi_2O_3$ component content is preferably 15% or less, more preferably less than 15%, more preferably less than 10%, more preferably 8% or less, and most preferably less than 5%.

The $TeO_2$ component is a component capable of lowering the glass transition point, when it is contained in an amount of greater than 0%. In particular, setting the $TeO_2$ component content to be greater than 0% allows the glass to soften at a low temperature, and promotes precipitation of lithium ion conductive crystals at a low temperature. Therefore, the $TeO_2$ component content is preferably greater than 0%, more preferably 0.5% or more, more preferably 1% or more, and most preferably 1.5% or more. On the other hand, setting the $TeO_2$ component content to 15% or less tends to maintain easiness of precipitation of lithium ion conductive crystals at a low temperature and tends to maintain a high lithium ion conductivity. Therefore, the $TeO_2$ component content is preferably 15% or less, more preferably less than 15%, more preferably 12% or less, more preferably less than 10%, and most preferably 8.5% or less.

The $SiO_2$ component is an optional component and stabilizes the glass and enhances devitrification resistance when it is contained in an amount greater than 0%. On the other hand, an overly high content of the $SiO_2$ component stabilizes the glass, but it is difficult for crystallization to take place, and this results in reduction in the lithium ion conductivity. Therefore, the $SiO_2$ component content is preferably 5% or less, more preferably less than 5%, more preferably 3% or less, more preferably 2% or less, and more preferably less than 1%.

The $B_2O_3$ component is an optional component and forms glass networks and increases devitrification resistance when it is contained in an amount greater than 0%. On the other hand, an overly high content of the $B_2O_3$ component stabilizes the glass, but it is difficult for crystallization to take place, and this results in reduction in the lithium ion conductivity. Therefore, the $B_2O_3$ component content is preferably 8% or less, more preferably 6% or less, and most preferably less than 4%.

The $Nb_2O_5$ component is an optional component and can enhance devitrification resistance during melting when it is contained in an amount greater than 0%. On the other hand, decreasing the $Nb_2O_5$ component content to 15% or less reduces the change in the valence state due to reduction reaction, and this improves the lithium ion conductivity. Therefore, the $Nb_2O_5$ component content is preferably 15% or less, preferably less than 15%, more preferably less than 10%, and most preferably less than 5%.

The $TiO_2$ component is an optional component and can enhance the stability of the glass, when it is contained in an amount greater than 0%. On the other hand, decreasing the $TiO_2$ component content to 15% or less reduces the change in the valence state due to reduction reaction, and this improves the lithium ion conductivity. Therefore, the $TiO_2$ component content is preferably 15% or less, more preferably less than 15%, more preferably less than 10%, more preferably less than 5%, and most preferably less than 1%.

The $ZrO_2$ component is an optional component and can enhance the stability of the glass, when it is contained in an amount greater than 0%. On the other hand, an overly high content of the $ZrO_2$ component makes it difficult to melt the glass, and devitrification easily occurs during cooling. As a result, it becomes difficult to obtain glass in a stable manner. Furthermore, the lithium ion conductivity decreases upon completion of crystallization. Therefore, the $ZrO_2$ component content is preferably 15% or less, more preferably less than 15%, more preferably less than 10%, more preferably less than 5%, and most preferably less than 1%.

It is desirable that the $Na_2O$ and $K_2O$ components be contained in a level as low as possible. When these components exist in the lithium ion conductor precursor glass and the lithium ion conductor, a mixing effect of the alkali ions prevents Li ions from conducting and it becomes easier to lower the lithium ion conductivity. Accordingly, the content of the $Na_2O$ and $K_2O$ components is preferably 8% or less, more preferably 4% or less, more preferably 2% or less, more preferably 1% or less, and most preferably less than 1%.

The ratio of the $Bi_2O_3$ component content to the $GeO_2$ component content is preferably 1.0 or less. Setting this ratio to 1.0 or less facilitates softening of the lithium ion conductor precursor glass at a low temperature and promotes crystallization at a low temperature. Therefore, the mass ratio $Bi_2O_3/GeO_2$ is preferably 1.0 or less, more preferably less than 1.0, more preferably 0.9 or less, more preferably 0.7 or less, and most preferably 0.6 or less.

The ratio of the $TeO_2$ component content to the $GeO_2$ component content is preferably 1.0 or less. Setting this ratio to 1.0 or less facilitates softening of the lithium ion conductor precursor glass at a low temperature and promotes crystallization at a low temperature. Therefore, the mass ratio $TeO_2/GeO_2$ is preferably 1.0 or less, more preferably less than 1.0, more preferably 0.9 or less, more preferably 0.7 or less, and more preferably 0.6 or less.

The ratio of contents of the $Bi_2O_3$ and $TeO_2$ components to the $GeO_2$ component content is preferably 1.0 or less. Setting this ratio to 1.0 or less facilitates softening of the lithium ion conductor precursor glass at a low temperature and promotes crystallization at a low temperature. Therefore, the mass ratio ($Bi_2O_3$ and $TeO_2$)/$GeO_2$ is preferably 1.0 or less, more preferably less than 1.0, more preferably 0.9 or less, more preferably 0.7 or less, and most preferably 0.6 or less.

The form of the lithium ion conductor precursor glass of the present invention is not particularly limited, and a powder form or a bulk form can be adopted. In particular, the lithium ion conductor precursor glass of the present invention can be easily used as a member for batteries because the inventive lithium ion conductor precursor glass is in the form of powder, and therefore the inventive lithium ion conductor precursor glass can easily form an interface with an electrode active material, can be mixed well with an electrode active material, and enters into a gap between electrode active materials and adheres the electrode active materials, for example.

When the lithium ion conductor precursor glass is used as powder, the average particle diameter D50 of the powder is preferably 10 μm or less, and especially 5 μm or less, in order to obtain the above effects. The lower limit is not particularly limited, but an overly small diameter makes it difficult to obtain the above effects because such lithium ion conductor precursor glass easily agglomerates. Therefore, the average particle diameter D50 of the precursor glass powder is preferably 0.1 μm or more.

As a grinding method (apparatus) for obtaining the lithium ion conductor precursor glass powder, a ball mill (including planetary type) regardless of wet grinding or dry grinding, a jaw crusher, a jet mill, a disc mill, a spectromill, a grinder, a mixer mill or the like is available. From the viewpoint of running cost and grinding efficiency, a ball mill is preferred. After pulverization, precursor glass powder having a desired average particle diameter can be obtained by classification as necessary.

The lower the glass transition point Tg of the lithium ion conductor precursor glass, the lower the temperature at which the glass softens. This can improve the bonding property between the electrode and the solid electrolyte while lowering reactivity of the interface with the electrode active material. Therefore, the glass transition point Tg of the lithium ion conductor precursor glass is preferably 510° C. or less, more preferably 505° C. or less, and most preferably 500° C. or less.

The lithium ion conductor can be obtained by crystallizing the lithium ion conductor precursor glass by heat treatment.

The lower the crystallization initiation temperature $T_x$, which determines the heat treatment temperature for developing lithium ion conductivity in the lithium ion conductor precursor glass, the lower the reactivity at the interface with the electrode active material. As a result, even when the precursor glass and the electrode active material are contacted or completely mixed and subjected to a heat treatment, an interface can be formed without impairing the performance of the electrode active material, and a solid lithium ion secondary battery exhibiting favorable battery characteristics, or an electrode thereof can be produced. $T_x$ is preferably less than 590° C., more preferably less than or equal to 585° C., and most preferably less than or equal to 580° C.

In the lithium ion conductor, it is preferable for a $Li_{1+x}Al_xGe_{2-x}(PO_4)_3$ crystal (0<x<2), (hereinafter, referred to as LAGP), which is a lithium ion conductive crystal, to be precipitated in the lithium ion conductive conductor.

Since crystallization of a crystal other than the lithium ion conductive crystal, typified by $BiPO_4$, may release energy and promote crystallization of the lithium ion conductive crystal in some cases, a crystal other than the lithium ion conductive crystal, e.g., $BiPO_4$, $Li_3PO_4$, $LiPO_3$, $TeO_2$, $GeO_2$, $AlPO_4$ or the like, may be concurrently precipitated in the lithium ion conductor.

The lithium ion conductivity of the lithium ion conductor of the present invention is preferably $1.0 \times 10^{-7}$ or more, more preferably $2.5 \times 10^{-7}$ S/cm or more, and most preferably $5.0 \times 10^{-7}$ S/cm or more. As a result, for example, it can be used for a member of a solid lithium ion secondary battery. Here, the higher the lithium ion conductivity, the more improved the performance of the battery.

Subsequently, a method of manufacturing the lithium ion conductor precursor glass and the lithium ion conductor of the present invention are described.

The lithium conductor precursor glass of the present invention is produced, for example, as follows. That is, the lithium conductor precursor glass of the present invention can be produced by uniformly mixing the raw materials so that the content of each component is within a predetermined content range; placing the mixture in a quartz crucible, an alumina crucible or a platinum crucible and melting the mixture for 0.5 to 4 hours in a temperature range of 1,100° C. to 1,350° C. to perform stirring and homogenization; and casting the mixture in a mold and slowly cooling the mixture, pressing the mixture in a mold, or casting the mixture in water at 5 to 25° C.

The lithium ion conductor of the present invention is produced, for example, in the following manner. That is, the lithium ion conductor precursor glass is subjected to a heat treatment at a temperature around the crystallization initiation temperature $T_x$ to crystalize the lithium ion conductor precursor glass. Here, the shape of the lithium ion conductor precursor glass is not particularly limited, and bulk glass or a molded glass obtained by pulverizing bulk glass to obtain powder, subjecting resulting powder to press molding, may be subjected to a heat treatment.

If the temperature of the heat treatment of the lithium ion conductor precursor glass is too low, the lithium ion conductive crystal is not sufficiently precipitated, and this results in low lithium ion conductivity. On the other hand, when an electrode active material is contacted with or mixed with an electrode active material and subjected to a heat treatment, an overly high heat treatment temperature allows the lithium ion conductor precursor glass to react with the electrode active material, thereby causing deterioration in the performance of the electrode active material and deterioration in the lithium ion conductivity of the lithium ion conductor. Therefore, the heat treatment temperature is preferably in the range of 500 to 700° C., more preferably in the range of 510 to 675° C., and most preferably in the range of 520 to 650° C.

Subsequently, examples in which the inventive lithium ion conductor is used as a solid electrolyte in a solid type lithium ion secondary battery are described.

The solid type lithium ion secondary battery is basically composed of a positive electrode, a negative electrode, and a solid electrolyte layer. The solid electrolyte layer is disposed between the positive and negative electrodes so as to be in contact with the respective electrodes and impart electrical insulation and lithium ion conductivity.

Here, the positive and negative electrode active materials are not particularly limited and known materials can be used. Examples of the positive electrode active material include lithium cobaltate, lithium nickelate, lithium manganate, lithium iron phosphate, and lithium cobalt phosphate. Examples of the negative electrode include carbon materials such as graphite, fibrous carbon, and soft carbon, metals such as Si and Sn, and oxide-based materials such as lithium titanate. As the solid electrolyte layer, the lithium ion conductor of the present invention or a different solid electrolyte ($Li_{1-x}M_xTi_{2-x}(PO_4)_3$ (M=Al or rare earth element) of NASICON type or garnet type crystals typified by $Li_7La_3Zr_2O_{12}$) may be used.

In addition, in order to improve lithium ion conductivity in the electrode, to achieve low-temperature bonding of the electrode active material, and to reduce interfacial resistance between the electrode and the solid electrolyte, it is possible to use the lithium ion conductor of the present invention in an electrode composite element in which an electrode active material and a solid electrolyte are mixed, or between an electrode and a solid electrolyte.

The electrode composite element in which an electrode active material and the lithium ion conductor of the present invention are mixed is manufactured, for example, in the following manner. That is, an arbitrary electrode active material is uniformly mixed with the above-mentioned lithium ion conductor precursor glass, a conductive auxiliary agent such as carbon black, if necessary, a dispersing agent, a thickening agent, and an organic solvent to prepare a slurry or a paste. This is formed into a sheet, coated or laminated, using a coating machine such as a screen printing press or a doctor blade, and then a heat treatment is applied. Alternatively, the prepared slurry or paste is dried to obtain an electrode active material mixed powder, and normal pressure sintering, hot pressing, and SPS sintering are performed.

In the above-mentioned electrode composite element, the energy density of the lithium ion secondary battery increases as the amount of the active material in the electrode increases, it is desirable that the electrode active material be contained in an appropriately adjusted amount of 1.0 to 99.9% by volume.

A solid lithium ion secondary battery using the above-described electrode composite element is manufactured, for example, in the following manner. That is, the electrode active material mixed powder and a solid electrolyte (including the inventive lithium ion conductor precursor glass) are packed in order into a mold, and the electrode-solid electrolyte is integrally molded, sintered, and crystallized using hot pressing or SPS-sintering.

EXAMPLES

The compositions of Examples 1 to 37 and Comparative Example 1, as well as results of $T_x$ temperatures, heat treatment temperatures of the precursor glasses, and lithium ion conductivity of the lithium ion conductors are shown in Tables 1 to 7. It should be noted that the following examples are for illustrative purposes only and are not intended to be limiting.

In each of Examples 1 to 37 and Comparative Example 1 of the present invention shown in Tables 1 to 7, raw materials of high purity used for ordinary glasses such as corresponding oxides, hydroxides, carbonates, nitrates, fluorides, chlorides, ammonium salts, and metaphosphate compounds were selected as raw materials for the respective components. Predetermined glass raw material powders were prepared and uniformly mixed so as to have compositions of the Examples and the Comparative Example shown in Tables 1 to 7. Each of the glass raw material powders uniformly mixed was put into a platinum crucible and melted in an electric furnace in a temperature range of 1,100 to 1,350° C. for 0.5 to 4 hours in accordance with the degree of difficulty of melting of the glass composition to perform stirring and homogenization. Thereafter, the molten glass was cast on a cast iron plate and gradually cooled or poured into a mold and quenched by pressing to obtain a lithium ion conductor precursor glass.

Measurements of $T_x$ temperatures according to Examples 1 to 37 and Comparative Example 1 have been performed as follows. The precursor glass was pulverized into a powder form using a mortar or the like, and the powder was subjected to TG-DTA measurement at a temperature elevation rate condition of 10° C./min using a TG-DTA device, STA-409CD manufactured by NETZSCH. The temperature at which precipitation of crystals starts in the obtained DTA curve was defined as a crystallization initiation temperature $T_x$.

The heat treatment of the lithium ion conductor precursor glass was performed as follows. The precursor glass was put into an electric furnace or the like maintained at the heat treatment temperature described in Tables 1 to 7, heat-treated for 1 hour, and crystallized to obtain a lithium ion conductor.

The lithium ion conductivity of the lithium ion conductors according to Examples 1 to 37 and Comparative Example 1 was measured as follows. The thickness of the above lithium ion conductors was 0.1 to 3 mm. If there was any deposit on the surface, the deposit was removed by, for instance, polishing the surface with sandpaper, and the surface was cleaned. Then, sputtering was performed using a quick coater manufactured by Sanyu Electron Co., Ltd., on both sides of the sample using gold as a target, and gold electrodes were attached to both sides of the sample. In this regard, a resistance value of the sample was determined from a Nyquist plot ranging from 0.1 Hz to 1 MHz by complex impedance measurement based on an alternating-current two-terminal method, using a potentiogalvanostat PARSTAT2273 manufactured by Princeton Applied Research, and the lithium ion conductivity at 25° C. was calculated.

A result of X-ray diffraction measurement of a crystal phase precipitated in the lithium ion conductor confirmed that a lithium ion conductive crystal, $Li_{1+x}Al_xGe_{2-x}(PO_4)_3$ ($0<x<2$), had been precipitated. The result also confirmed that concurrently precipitated crystals other than the lithium ion conductive crystal were mainly $BiPO_4$, $AlPO_4$, $GeO_2$, and the like. The X-ray diffraction measurement was conducted on a powder X-ray diffractometer (X'Part-MPD manufactured by Philips Japan) using X-rays generated by a Cu target at a voltage of 40 KV and a current value of 30 mA, at scan speed of 0.04°/s in the range of $2θ=10$ to $75°$.

As is clear from Tables 1 to 7, the lithium ion conductor precursor glasses of Examples 1 to 37 of the present invention had a low $T_x$, and at the same time, crystals other than the lithium ion conductive crystal were precipitated, so that crystallization proceeded even at a low temperature, and the lithium ion conductivity required for cell performance was exhibited. On the other hand, since the lithium ion conductor precursor of Comparative Example 1 had a high $T_x$, crystallization did not easily proceed at a low temperature. As a result, there was likelihood that reaction with other components may occur and deteriorate battery performance.

TABLE 1

| Example (unit: mol %) | No. 1 | Comparative Example 1 |
|---|---|---|
| $Li_2O$ | 22 | 22.25 |
| $Al_2O_3$ | 5 | 6.25 |
| $P_2O_5$ | 37 | 34 |
| $GeO_2$ | 33 | 37.5 |
| $Bi_2O_3$ | 3 | |
| $B_2O_3$ | | |
| $ZrO_2$ | | |
| $SiO_2$ | | |
| $TeO_2$ | | |
| Total | 100 | 100 |
| ($Bi_2O_3$ or/and $TeO_2$)/$GeO_2$ | 0.091 | 0.000 |
| $T_x$ [° C.] | 575.3 | 590 |
| Heat treatment temperature [° C.] | 600 | 600 |
| Lithium ion conductivity [S/cm] | $1.6 \times 10^{-4}$ | $2.7 \times 10^{-5}$ |

TABLE 2

| Example (unit: mol %) | No. 2 | No. 3 | No. 4 | No. 5 | No. 6 | No. 7 |
|---|---|---|---|---|---|---|
| $Li_2O$ | 20 | 25 | 22 | 24 | 22 | 20 |
| $Al_2O_3$ | 3 | 3 | 4 | 4 | 5 | 4 |
| $P_2O_5$ | 33 | 34 | 37 | 38 | 37 | 38 |
| $GeO_2$ | 35 | 35 | 35 | 32 | 33 | 35 |
| $Bi_2O_3$ | 9 | 3 | 2 | 2 | 3 | 3 |
| $B_2O_3$ | | | | | | |
| $ZrO_2$ | | | | | | |
| $SiO_2$ | | | | | | |
| $TeO_2$ | | | | | | |
| Total | 100 | 100 | 100 | 100 | 100 | 100 |
| ($Bi_2O_3$ or/and $TeO_2$)/$GeO_2$ | 0.257 | 0.086 | 0.057 | 0.063 | 0.091 | 0.086 |
| $T_x$ [° C.] | 548.0 | 583.9 | 587.2 | 581.5 | 569.8 | 587.9 |
| Heat treatment temperature [° C.] | 600 | 550 | 550 | 550 | 550 | 550 |
| Lithium ion conductivity [S/cm] | $1.2 \times 10^{-5}$ | $2.1 \times 10^{-7}$ | $4.2 \times 10^{-6}$ | $2.7 \times 10^{-6}$ | $4.5 \times 10^{-5}$ | $9.4 \times 10^{-6}$ |

TABLE 3

| Example (unit: mol %) | No. 8 | No. 9 | No. 10 | No. 11 | No. 12 | No. 13 |
|---|---|---|---|---|---|---|
| $Li_2O$ | 22 | 22 | 20 | 16 | 19 | 26 |
| $Al_2O_3$ | 8 | 5 | 3 | 1 | 1 | 5 |
| $P_2O_5$ | 37 | 40 | 24 | 37 | 37 | 32 |
| $GeO_2$ | 30 | 30 | 50 | 33 | 32 | 31 |
| $Bi_2O_3$ | 3 | 3 | 3 | 13 | 11 | 3 |
| $B_2O_3$ | | | | | | |
| $ZrO_2$ | | | | | | |
| $SiO_2$ | | | | | | 3 |
| $TeO_2$ | | | | | | |
| Total | 100 | 100 | 100 | 100 | 100 | 100 |
| ($Bi_2O_3$ or/and $TeO_2$)/$GeO_2$ | 0.100 | 0.100 | 0.060 | 0.394 | 0.344 | 0.097 |
| $T_x$ [° C.] | 563.0 | 584.2 | 581.1 | 554.1 | 533.3 | 538.7 |
| Heat treatment temperature [° C.] | 550 | 600 | 600 | 600 | 600 | 600 |
| Lithium ion conductivity [S/cm] | $2.7 \times 10^{-6}$ | $2.2 \times 10^{-6}$ | $2.4 \times 10^{-6}$ | $1.1 \times 10^{-6}$ | $2.5 \times 10^{-7}$ | $6.9 \times 10^{-5}$ |

TABLE 4

| Example (unit: mol %) | No. 14 | No. 15 | No. 16 | No. 17 | No. 18 | No. 19 |
|---|---|---|---|---|---|---|
| $Li_2O$ | 22 | 22 | 22 | 23.5 | 22 | 23.5 |
| $Al_2O_3$ | 5 | 5 | 5 | 5.5 | 5 | 5 |
| $P_2O_5$ | 37 | 38 | 40 | 39 | 39 | 39 |
| $GeO_2$ | 33 | 31 | 31 | 29 | 32 | 31.5 |
| $Bi_2O_3$ | 2 | 4 | 2 | 3 | 2 | 1 |
| $B_2O_3$ | 1 | | | | | |
| $ZrO_2$ | | | | | | |
| $SiO_2$ | | | | | | |
| $TeO_2$ | | | | | | |
| Total | 100 | 100 | 100 | 100 | 100 | 100 |
| ($Bi_2O_3$ or/and $TeO_2$)/$GeO_2$ | 0.061 | 0.129 | 0.065 | 0.103 | 0.063 | 0.032 |
| $T_x$ [° C.] | 586.1 | 563.0 | 589.2 | 564.2 | 588.3 | 583.8 |
| Heat treatment temperature [° C.] | 600 | 600 | 600 | 600 | 600 | 600 |
| Lithium ion conductivity [S/cm] | $1.4 \times 10^{-5}$ | $2.2 \times 10^{-6}$ | $1.6 \times 10^{-5}$ | $1.4 \times 10^{-5}$ | $2.5 \times 10^{-5}$ | $3.5 \times 10^{-5}$ |

TABLE 5

| Example (unit: mol %) | No. 20 | No. 21 | No. 22 | No23 | No. 24 | No. 25 |
|---|---|---|---|---|---|---|
| $Li_2O$ | 22 | 22 | 22 | 22 | 24 | 22 |
| $Al_2O_3$ | 5 | 5 | 5 | 4.5 | 4 | 5 |
| $P_2O_5$ | 37 | 37 | 32.5 | 32 | 32 | 32.5 |
| $GeO_2$ | 33 | 31 | 35.5 | 35 | 37 | 35.5 |
| $Bi_2O_3$ | | | | | | 1 |
| $B_2O_3$ | | | | | | |
| $ZrO_2$ | | | | | | |
| $SiO_2$ | | | | | | |
| $TeO_2$ | 3 | 5 | 5 | 6.5 | 3 | 4 |
| Total | 100 | 100 | 100 | 100 | 100 | 100 |
| ($Bi_2O_3$ or/and $TeO_2$)/$GeO_2$ | 0.091 | 0.161 | 0.141 | 0.186 | 0.081 | 0.141 |
| $T_x$ [° C.] | 588.8 | 580.6 | 570.9 | 566.8 | 571.1 | 575.2 |
| Heat treatment temperature [° C.] | 600 | 600 | 550 | 600 | 550 | 600 |
| Lithium ion conductivity [S/cm] | $3.6 \times 10^{-5}$ | $4.8 \times 10^{-5}$ | $1.1 \times 10^{-5}$ | $1.2 \times 10^{-4}$ | $3.8 \times 10^{-6}$ | $1.1 \times 10^{-4}$ |

TABLE 6

| Example (unit: mol %) | No. 26 | No. 27 | No. 28 | No. 29 | No. 30 | No. 31 |
|---|---|---|---|---|---|---|
| $Li_2O$ | 22 | 23.5 | 25 | 24 | 24 | 21 |
| $Al_2O_3$ | 5 | 5.5 | 6 | 5.5 | 4.5 | 4.5 |
| $P_2O_5$ | 32.5 | 32.5 | 31.5 | 33 | 31.5 | 34 |
| $GeO_2$ | 35.5 | 35.5 | 34.5 | 33.5 | 37 | 36.5 |
| $Bi_2O_3$ | | | | | | |
| $B_2O_3$ | | | | | | |
| $ZrO_2$ | 1 | | | | | |
| $SiO_2$ | | | | | | |
| $TeO_2$ | 4 | 3 | 3 | 4 | 3 | 4 |
| Total | 100 | 100 | 100 | 100 | 100 | 100 |
| ($Bi_2O_3$ or/and $TeO_2$)/$GeO_2$ | 0.113 | 0.085 | 0.087 | 0.119 | 0.081 | 0.110 |
| $T_x$ [° C.] | 560.5 | 564.5 | 549.5 | 564.4 | 558.8 | 570.4 |
| Heat treatment temperature [° C.] | 600 | 600 | 600 | 600 | 600 | 600 |
| Lithium ion conductivity [S/cm] | $1.4 \times 10^{-5}$ | $3.0 \times 10^{-5}$ | $4.1 \times 10^{-5}$ | $2.5 \times 10^{-5}$ | $3.2 \times 10^{-5}$ | $7.5 \times 10^{-5}$ |

TABLE 7

| Example (unit: mol %) | No. 32 | No. 33 | No. 34 | No. 35 | No. 36 | No. 37 |
|---|---|---|---|---|---|---|
| $Li_2O$ | 22 | 23 | 20 | 20 | 19.5 | 20 |
| $Al_2O_3$ | 5 | 5 | 4 | 4 | 3.5 | 4 |
| $P_2O_5$ | 34 | 33 | 36 | 32 | 37.5 | 31 |
| $GeO_2$ | 34 | 32 | 29 | 29 | 28.5 | 35 |
| $Bi_2O_3$ | | | | | | |
| $B_2O_3$ | | | | | | |
| $ZrO_2$ | | | | | | |
| $SiO_2$ | | | | | | |
| $TeO_2$ | 5 | 7 | 11 | 15 | 11 | 10 |
| Total | 100 | 100 | 100 | 100 | 100 | 100 |
| ($Bi_2O_3$ or/and $TeO_2$)/$GeO_2$ | 0.147 | 0.219 | 0.379 | 0.517 | 0.386 | 0.286 |
| $T_x$ [° C.] | 569.2 | 561.6 | 561.5 | 574.0 | 587.4 | 571.6 |
| Heat treatment temperature [° C.] | 600 | 600 | 550 | 550 | 600 | 600 |
| Lithium ion conductivity [S/cm] | $6.2 \times 10^{-5}$ | $5.1 \times 10^{-5}$ | $3.9 \times 10^{-5}$ | $5.1 \times 10^{-6}$ | $7.2 \times 10^{-5}$ | $5.4 \times 10^{-5}$ |

The invention claimed is:

1. A lithium ion conductor precursor glass, comprising:
a $Li_2O$ component in an amount of 10 mol % to 35 mol %,
a $P_2O_5$ component in an amount of 36 mol % to 50 mol %,
an $Al_2O_3$ component in an amount greater than 0 mol % and equal to or less than 15 mol %,
a $GeO_2$ component in an amount of 28 mol % to 50 mol %, and
a $Bi_2O_3$ component or/and a $TeO_2$ component in an amount greater than 0 mol % and equal to or less than 15 mol %, wherein a mass ratio of ($Bi_2O_3$ or/and $TeO_2$)/$GeO_2$ is 0.032 to 0.394.

2. The lithium ion conductor precursor glass according to claim 1, wherein crystallization initiation temperature $T_x$, at which crystallization into the precursor starts in a DTA curve obtained by TG-DTA measurement is less than 590° C.

3. A lithium ion conductor, wherein the lithium ion conductor is obtained by subjecting the lithium ion conductor precursor glass according to claim 1 to a heat treatment so that a crystal is precipitated in the lithium ion conductor precursor glass.

4. The lithium ion conductor according to claim 3, wherein a crystal of $Li_{1+x}Al_xGe_{2-x}(PO_4)_3$ is precipitated in the precursor glass, provided that x is in a range of 0<x<2.

5. The lithium ion conductor according to claim 3, wherein lithium ion conductivity at 25° C. is $1 \times 10^{-7}$ S/cm or more.

6. An electrode composite element, comprising 1.0 volume % to 99.9 volume % of a positive or negative active material and 0.1 volume % to 99.0 volume % of a lithium-ion conductor, wherein the lithium ion conductor is obtained by subjecting the lithium ion conductor precursor glass to a heat treatment so that a crystal is precipitated in the lithium ion conductor precursor glass,
wherein the lithium ion conductor precursor glass, comprises;
a $Li_2O$ component in an amount of 10 mol % to 35 mol %,
a $P_2O_5$ component in an amount of 36 mol % to 50 mol %,
an $Al_2O_3$ component in an amount greater than 0 mol % and equal to or less than 15 mol %,
a $GeO_2$ component in an amount of 28 mol % to 50 mol %, and
a Bi2O3 component, or/and a $TeO_2$ component in an amount greater than 0 mol % and equal to or less than 15 mol %, wherein a mass ratio of ($Bi_2O_3$ or/and $TeO_2$)/$GeO_2$ is 0.032 to 0.394.

7. A lithium ion half cell or a lithium ion battery, comprising the electrode composite element according to claim 6.

8. The lithium ion conductor precursor glass according to claim 1, wherein a content of the $TeO_2$ component is 8.5 mol % or less.

9. The lithium ion conductor precursor glass according to claim 1, wherein the $GeO_2$ component is present in an amount of 30 mol % to less than 42 mol %.

10. The lithium ion conductor precursor glass according to claim 1, wherein the lithium ion conductor precursor glass is in a form of a powder.

11. A lithium ion battery comprising a solid electrolyte, wherein the solid electrolyte comprises the lithium ion conductor according to claim 3.

12. The lithium ion conductor according to claim 3, wherein lithium ion conductivity at 25° C. is $1.1 \times 10^{-5}$ S/cm or more.

13. The electrode composite element according to claim 6, wherein the lithium ion conductor precursor glass comprises the $GeO_2$ component in an amount equal to or greater than 30 mol % and and less than 42 mol %.

14. The lithium ion conductor precursor glass according to claim 1, wherein the $Bi_2O_3$ is present.

15. The lithium ion conductor precursor glass according to claim 1, wherein
- a $Li_2O$ component in an amount of 15 mol % to 30 mol %,
- a $P_2O_5$ component in an amount of 36 mol % to 50 mol %,
- an $Al_2O_3$ component in an amount equal to or greater than 1 mol % and less than 10 mol %,
- a $GeO_2$ component in an amount of 28 mol % to 45 mol %, and
- a $Bi_2O_3$ component or/and a $TeO_2$ component in an amount of 1 mol % to 15 mol %.

* * * * *